United States Patent Office 2,788,836
Patented Apr. 16, 1957

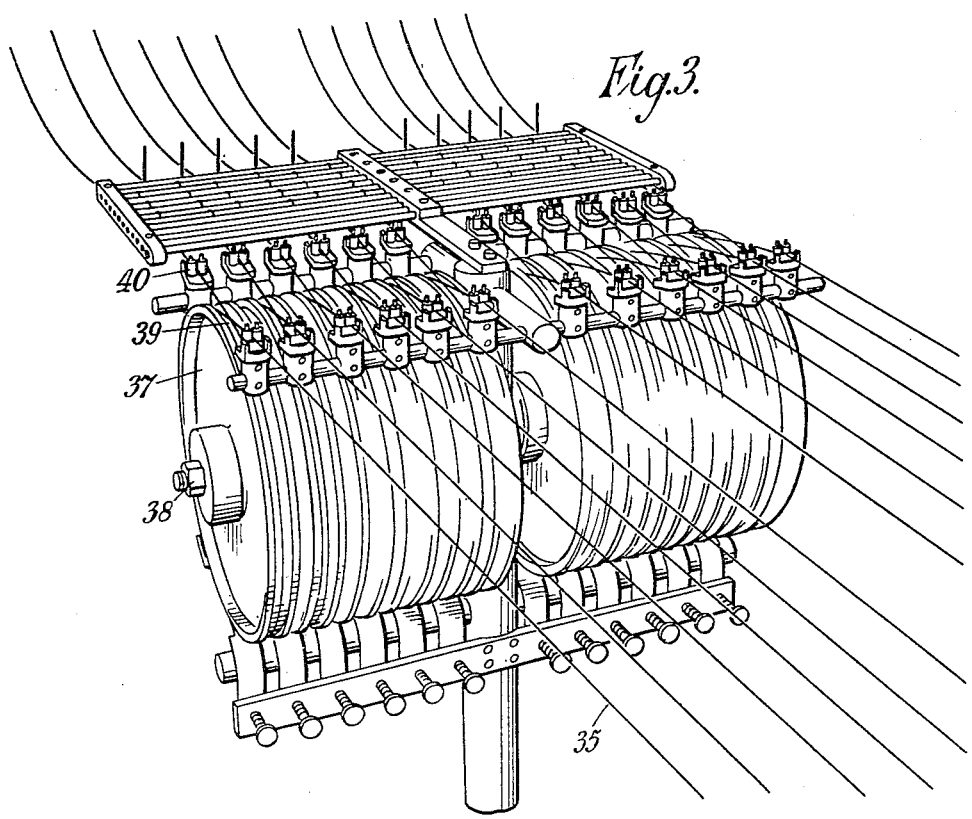

2,788,836

METHOD AND APPARATUS FOR MAKING
AIR PRESSURE CONTAINERS

Henry William Trevaskis, Solihull, and Erhard Martin, Leamington, England, assignors to Dunlop Rubber Company Limited, London, England, a British company Application February 11, 1955, Serial No. 487,603

10 Claims. (Cl. 154—1.8)

This invention relates to air pressure containers, particularly for aircraft, and to a method and apparatus for making air pressure containers comprising an inner shell and a substantially uniform covering of resin impregnated glass fibre having a high tensile strength.

Air pressure containers, or air bottles usually comprise a cylindrical or spherical container which is normally of seamless construction and which may be made of light alloy or, where high pressures are required, of high tensile steel. Pneumatic operating pressures for aircraft have been steadily increasing over the past few years, and steel containers large enough to store the required volume of compressed air may be unacceptably heavy. A further disadvantage of all-metal containers is the high cost, particularly of fabrication, test and the like, and the danger of fragmentation if a burst occurs.

Air pressure containers comprising a resin-impregnated and cured glass fibre envelope are known, the advantage of glass fibre being its lightness, comparative cheapness and very high tensile strength. The glass fibre is impregnated with resin and is wound uniformly around the major circumference of a shell until a layer of predetermined thickness has been built up. The resin-soaked fibre is then cured to provide, a hard, light envelope having a very high tensile strength. The shell is provided with one or more pressure connections which project through the envelope.

The object of the present invention is to provide a novel method and apparatus for covering a shell with a substantially uniform layer of filamentary material, e. g. glass fibre.

According to the invention a method of covering a shell with a filamentary material comprises rotating said shell about an axis thereof, simultaneously rotating said shell about another axis, automatically moving said latter axis through a predetermined angular displacement and feeding said filamentary material on to the periphery of said rotating shell to substantially uniformly cover the shell with said material.

Preferably the shell is spherical and is provided with two diametrically opposed pressure connections which constitute one axis of rotation of the sphere and this axis is adapted to be moved automatically during the winding operation so that the circumference of the sphere, excluding the pressure connections, is substantially uniformly covered with the filamentary material, which may be glass fibre. A plurality of fibres (rovings or yarns respectively) e. g. of the order of 10, may be wound together. The fibres are tensioned before winding and are run through a bath of liquid resin so that the envelope, when wound, is impregnated with the resin, which can subsequently be cured. The shell may be made of metal or any suitable plastomer or elastomer, e. g. nylon, rubber and the like.

According to the invention also apparatus for covering a shell with filamentary material comprises a rotatable spigot for securing the shell to the apparatus, means to rotate the shell about the axis of a spindle, means to rotate the shell about the axis of the spigot at a predetermined rate relative to the said rate of rotation about the spindle axis, means for moving the spigot through a predetermined angular displacement at a predetermined rate relative to the said rate of rotation about the spindle axis and means for feeding said filamentary material to the circumference of said rotating shell.

The spindle may be rotated by hand or by machine and preferably a revolution counter is fitted to indicate the number of turns the spindle takes. Rotation of the spindle rotates the shell secured to the spigot which is rotatably associated with said spindle. The spindle, through a system of gears and a chain rotates the spigot about its own longitudinal axis, the spigot rotation being geared down to approximately 1/500 of the spindle rotation. Simultaneous with rotation of the spindle a system of gears and shafts moves the spigot through a predetermined angular displacement, e. g. 65°, and at a predetermined rate, whereby the shell, which is preferably spherical, is covered with said material after a predetermined number of spindle revolutions.

An apparatus for covering a hollow shell with glass fibre material to form an air pressure container will now be described with reference to the accompanying drawings, of which:

Figure 3 is a perspective view of a tensioning device which may be used in co-operation with the apparatus illustrated in Figures 1 and 2.

Figure 1:
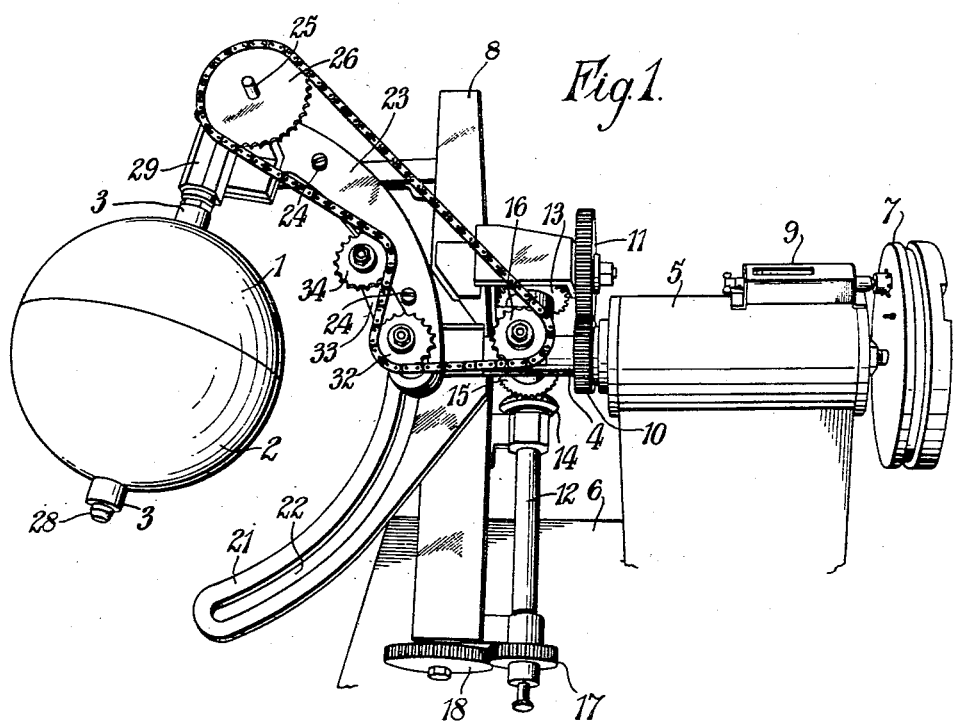
Figure 1 is a view of an apparatus constructed in accordance with the invention and showing a shell mounted therein and ready for winding.

The shell comprises two hollow hemispheres, 1 and 2 (Figure 1) joined together to form a complete sphere. Each hemisphere is provided with a pressure connection comprising a cylindrical internally-threaded boss 3, said bosses 3 being diametrically-opposed when the parts 1, 2 of the sphere are assembled together.

The apparatus comprises a spindle 4 (Figure 1) which is rotatable in bearings carried by a housing 5 which is in turn supported on a base plate 6. The spindle 4 projects from both ends of the housing 5, one end thereof having secured thereto a pulley 7 whereby the spindle 4 may be rotated, and the other end thereof having a beam 8 secured thereto. The beam 8 is secured substantially at its mid-position to said spindle 4, the axis thereof being normal to that of the spindle 4. A "trip-type" revolution counter 9 is fitted to the housing to indicate the number of revolutions the spindle 4 makes when it is rotated.

Figure 2:
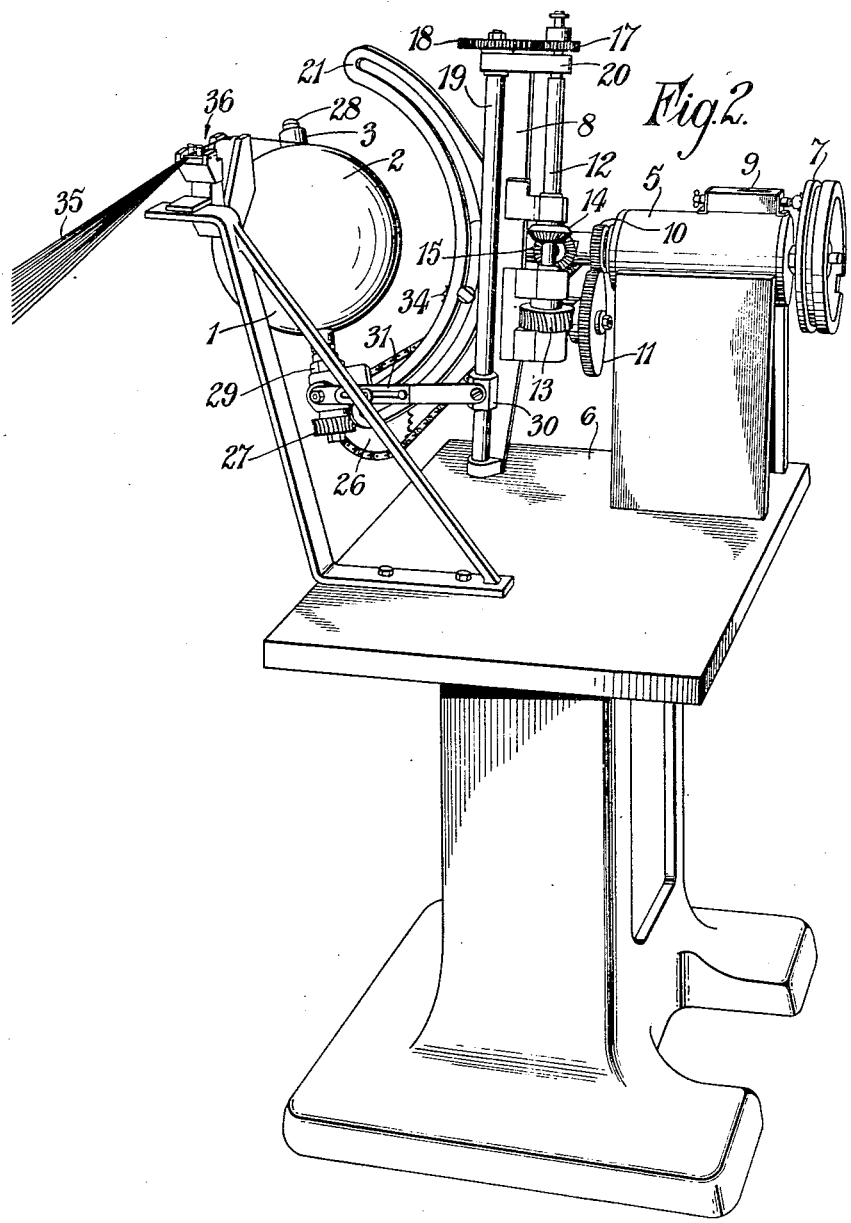
Figure 2 is a view of the same apparatus and showing a bottle in the course of being wound.

The spindle 4 is encircled by a coaxially aligned gear 10 which is immovably secured to the housing 5 and meshes with a larger gear 11 which in turn rotates a relief-spindle 12 through a worm and worm wheel 13, (Figure 2) when spindle 4 is rotated. A bevel gear 14 (Figure 1) is secured to the relief spindle 12 and this gear 14 meshes with an equisized gear 15 mounted on one end of a shaft which extends parallel to a diameter of the spindle 4 and to which chain sprocket 16 is secured. A pinion 17 is secured to the other end of the relief spindle 12 remote from the bevel gear 14 and this meshes with a spur gear 18 secured to one end of a threaded shaft 19 (Figure 2) which extends along the length of the beam 8, parallel to the unthreaded relief spindle 12, each end thereof being rotatably supported in bearings 20.

A substantially semi-circular runner 21 is secured to the beam, on the edge thereof remote from the spindle 4, and lying in a plane containing the major axis of the beam 8. The runner 21 is symmetrical about the axis of the spindle 4, and is provided with a slot 22 curved to the radius of the runner 21 and which extends from a location adjacent one end to a location adjacent the other end of the runner 21.

An arm 23 curved to the same radius as said runner 21 but only approximately half its length, i e. quarter circular, is slidable along the runner 21, studs 24 extending from one face thereof being slidably secured in said slot 22. The arm 23 is initially located at one end of the runner 21, one end of said arm 23 being substantially in line with the axis of the spindle 4.

A boss (not shown) is secured to the end of the arm 23 which when in this initial position lies remote from the spindle 4, and a pin 25, rotatably mounted therein, has a chain-wheel 26 secured thereto on one side of the boss and a worm (not shown) secured thereto on the other side of the boss. The worm meshes with a worm wheel 27 (Figure 2) which in turn rotates a spigot 28 in a bush 29 secured to said end of the arm 23. A nut 30 is fitted to the threaded shaft 19 which extends alongside the beam 8, and one end of a sliding linkage 31 is secured thereto, the other end thereof being secured to the end of the arm 23 adjacent the bush 29.

Co-planar with the chain-wheel 26 a sprocket 32 is mounted at the other end of the arm 23, on the end of a boss projecting from one side of said arm 23 and rotatably mounted on said boss is a swinging arm 33, which carries a jockey sprocket 34, said sprockets 16, 32 and 34 and chain-wheel 26 being co-planar. A helically-wound spring (not shown) is fitted over said boss, said spring urging the swinging arm 33 in a direction to constantly tension a driving chain which is fitted to said sprockets and wheel.

The portion of the spigot 28 adjacent the bush 29 is threaded and the spherical shell formed from the hemispheres 1 and 2, is fitted over said spigot 28 and is secured to the threaded portion thereof by means of one of the pressure connections 3. With the apparatus ready for winding, the spigot 28 is set at an angle of the order of 80° from the axis of the spindle 4. A predetermined number of strands of glass fibre 35 (Figure 2) are led from spools, through a tensioning device (Figure 3) and the fibres then brought together and passed through a bath of liquid resin as indicated at 36. This multiple fibre is placed on the sphere and the spindle 4 rotated once, to rotate the sphere, beam 8, and attached parts, about the axis of the spindle 4, when said end may be tucked behind the following winding to secure it.

With the end of the multiple fibre secure the spindle 4 is rotated continuously. The spigot 28 is originally at an angle of the order of 80° to the spindle, and this allows the glass fibre to lie alongside the pressure connections 3 without covering them. The rotating spindle 4 rotates the sphere on the axis of the spindle 4 and the glass fibre is wound on to the sphere always at the major circumference thereof. Rotation of the spindle 4 also causes the gear 10 co-axial therewith to rotate the larger gear 11 and this in turn rotates the chain sprocket 16 through the worm 13 and bevel gears 14 and 15. The driving chain rotates the chain-wheel 26 which in turn drives the worm and worm wheel 27 associated therewith to revolve the spigot 28, and the gearing is such that for a predetermined number of turns of the spindle 4 e. g. 500, the spigot 28 to which the sphere is secured rotates once about its axis of rotation. Thus the sphere rotates 1/500 of a revolution about its spigot axis for each revolution of the spindle 4, and for 500 revolutions of the spindle 4 the sphere is covered with a layer of glass fibre extending circumferentially around the sphere and passing adjacent the pressure connections.

As the spindle 4 is rotated, the larger gear 11, rotatable thereby, rotates the relief spindle 12 and the pinion 17 which meshes with the spur wheel 18 to rotate the threaded shaft 19. The nut 30 threaded on the shaft 19 is prevented from rotation and consequently, as the threaded shaft 19 is rotated, the nut 30 rides along said shaft 19. The sliding linkage 31 secured to the nut 30 moves the arm 23 slidable in the slotted runner 21, together with the chain wheel 26 and the other attachments, and the spigot 28 with sphere attached, gradually into a position in which the spigot 28 is lying at an angle of approximately 15° from the axis of the spindle 4. The gearing is so arranged that the spigot 28 indexes through the necessary 65° i. e. from 80° to 15°, once for about every 15,000 revolutions of the spindle 4. As the arm 23 moves along the runner 21 the jockey sprocket 34 on the spring-loaded arm 33 prevents the driving chain from becoming slack.

The spindle 4 is of course rotated by a motor, e. g. an electric motor, through a pulley or by gears according to choice, although the pulley 7 may be replaced by a handle, and the spindle 4 rotated manually.

The shell, on which the glass fibre is wound, is preferably air-impermeable, since the glass-fibre envelope is not necessarily pressure tight. Satisfactory results have been obtained by using a very thin lining to prevent air leakage, and said lining may be a sheet rubber covering, or a rubber moulding or the shell may be swilled with a rubber solution. The shell may have one boss containing the pressure connection 3 and one "blind" boss.

The various gearing ratios may be varied to suit any particular size of bottle and, where relatively high ratios are required, the bevel gearing may be replaced by spur wheels and pinions.

In order to obtain the desired tensile strength of the air bottle it is necessary that each strand of glass fibre should be individually tensioned. Apparatus to achieve this (Figure 3) comprises a plurality of rotatable drums 37 mounted in side by side relationship upon a shaft 38, each of which is individually retarded by a braking means. Each drum 37 is provided, on its outer periphery with a grooved band of rubber 39 and a strand of glass fibre 35 is led from a bobbin 40, once round the grooved band 39, and thence to the winding apparatus through the attachment 36.

The braking system imposes a predetermined torque on its associated drum 37, and as the drums 37 are rotated by the glass fibre the strands of glass fibre 35 are thus individually tensioned.

Having now described our invention, what we claim is:
1. A method of covering a shell with a filamentary material comprising rotating said shell about an axis thereof, simultaneously rotating said shell about another axis, continuously moving the latter axis through an angular displacement and feeding said filamentary material on to the periphery of said rotating shell to substantially uniformly cover the shell with said material.

2. A method according to claim 1 which comprises covering said shell before winding, with a substantially air-impermeable covering.

3. A method according to claim 1 wherein a plurality of filaments of material are wound around said shell and which comprises individually tensioning each filament on winding.

4. Apparatus for covering a shell with a filamentary material which comprises a spindle rotatable on its axis, an arm, means mounted on said spindle to rotate with said spindle and slidably supporting said arm, a shell supporting spigot mounted on said arm to rotate about the axis of said shell and with the axis of rotation of the shell intersecting the axis of rotation of the spindle and movable with said arm in a continuous path transverse to the axis of said spindle to continuously vary the inclination of the axis of the spigot to the axis of the spindle, means to rotate the spigot in a definite ratio to the rotation of the spindle, means to slide the spigot continuously to different inclinations in definite ratio to the rotation of the spindle and means to supply a filament to the surface of a shell on said spigot.

5. Apparatus according to claim 4 wherein the means for moving the spigot comprises a guide rotatable with the spindle and supporting said arm associated with the spigot, said arm being movable in said guide.

6. Apparatus for covering a shell with a filamentary material comprising a spindle, an arm rotatable about the axis of said spindle, a rotatable spigot carried by said arm, the axis of rotation of the spigot intersecting the axis of the spindle, means to mount a spherical shell on said spigot with its center at the intersection of the axis of the spigot and the axis of the spindle, means driven from said spindle for rotating the spigot and the arm at rates in a fixed ratio to the rotation of the spindle, and means for moving the arm and the spigot carried by said arm at a rate proportionate to the rotation of the spigot in the plane containing its axis and the projected axis of the spindle while maintaining the centre of the shell at the intersection of the axes of the spigot and spindle.

7. Apparatus for covering a shell with a filamentary material which comprises a rotatable spigot for securing a shell in fixed position on said spigot, a driving mechanism for rotating said spigot about its axis, a second driving mechanism for rotating said spigot about a second axis angularly disposed to said first named axis and intersecting said first named axis at the position of the center of a shell mounted thereon, an indexing mechanism for progressively varying the angular disposition of said first named axis to said second named axis as said spigot is rotating about said axes, and means for feeding a filamentary material to the periphery of a rotating shell mounted on said spigot.

8. Apparatus of claim 7 wherein said indexing mechanism comprises a guiding member rotatable about said second named axis and having an arcuate slot centered on the center of a shell mounted on said spigot and substantially in a common plane with said first named axis, an arm carrying said spigot and having a stud slidable in said arcuate slot and a driving spindle driven from the driving means for rotating said spigot about said second named axis, a screw threaded shaft rotatable by said driving spindle and a transmission threaded on said screw threaded shaft and connected to said arm to move said arm in said slot as said spindle rotates.

9. Apparatus of claim 7 comprising a plurality of rotatable drums each having a soft resilient periphery, a torque retarding spring member engaging the periphery of each of said drum guide means to guide filamentary material on and off each said drum and to the surface of a shell mounted on said spigot whereby tension may be applied to strands of filamentary material prior to feeding to said shell.

10. Apparatus for covering a shell with a filamentary material which comprises a spindle rotatable about its axis, a supporting guide member mounted on said spindle transverse to the axis thereof and rotatable with said spindle, said guide member having an arcuate slot, a spigot rotatable about its axis and slidably mounted in the arcuate slot of said guiding and supporting member with its axis disposed angularly to the axis of said spindle, a chain and sprocket drive between said spindle and said spigot to rotate said spigot about its axis, a spherical shell detachably secured on said spigot and rotatable therewith, an arm having one end connected to said spigot and having an internally screw threaded boss, a screw threaded in said boss and rotatable by and with said spindle, said spigot having a stud engaging the arcuate slot of said guiding and supporting member, the axes of said spindle and said spigot coinciding at the center of said shell and said shell being simultaneously rotatable about the axis of said spigot and the axis of said spindle and the angular disposition of said spigot relative to said spindle being progressively variable during said rotation and means for feeding filamentary material to the periphery of said rotating shell.

References Cited in the file of this patent

UNITED STATES PATENTS

| 2,352,055 | Witt | June 20, 1944 |
| 2,518,967 | Witt | Aug. 15, 1950 |

FOREIGN PATENTS

| 119,588 | Australia | Feb. 10, 1943 |
| 175,638 | Switzerland | Mar. 15, 1935 |
| 267,350 | Switzerland | Mar. 31, 1950 |